United States Patent
Griffiths et al.

(10) Patent No.: US 9,572,353 B1
(45) Date of Patent: Feb. 21, 2017

(54) HIDE-ON WASHER WITH RECIPROCATING BRUSHES

(71) Applicants: Terry Cemlyn Griffiths, Carlton, GA (US); Braiden Thomas Griffiths, Newnan, GA (US); Larry Paul Griffiths, Overton, NV (US); Gregory L. Bilyeu, Chanute, KS (US)

(72) Inventors: Terry Cemlyn Griffiths, Carlton, GA (US); Braiden Thomas Griffiths, Newnan, GA (US); Larry Paul Griffiths, Overton, NV (US); Gregory L. Bilyeu, Chanute, KS (US)

(73) Assignees: Sanitation Chemical Dispensing, LLC, Chanute, KS (US); Terry Cemlyn Griffiths, Carlton, GA (US); Braiden Thomas Griffiths, Newnan, GA (US); Larry Paul Griffiths, Overton, NV (US)

(*) Notice: Subject to any disclaimer, the term of this patent is extended or adjusted under 35 U.S.C. 154(b) by 0 days.

(21) Appl. No.: 15/000,756

(22) Filed: Jan. 19, 2016

Related U.S. Application Data

(60) Provisional application No. 62/104,984, filed on Jan. 19, 2015.

(51) Int. Cl.
| | |
|---|---|
| *A22C 18/00* | (2006.01) |
| *A22B 5/00* | (2006.01) |
| *A22C 17/08* | (2006.01) |

(52) U.S. Cl.
CPC ............ *A22B 5/0082* (2013.01); *A22C 17/08* (2013.01)

(58) Field of Classification Search
CPC ...... A22C 21/0061; A22B 5/08; A22B 5/0082
USPC .................................................. 452/173, 123
See application file for complete search history.

(56) References Cited

U.S. PATENT DOCUMENTS

| | | | | |
|---|---|---|---|---|
| 3,711,895 | A * | 1/1973 | Arendale | A22B 5/08 452/173 |
| 5,938,519 | A * | 8/1999 | Wright | A22C 21/04 452/173 |
| 6,733,379 | B2 * | 5/2004 | Tsang | A22C 17/08 452/173 |
| 7,458,886 | B1 * | 12/2008 | Griffiths | A22B 5/08 452/173 |
| 7,566,260 | B1 * | 7/2009 | Griffiths | A22B 5/0082 452/173 |

(Continued)

*Primary Examiner* — Richard Price, Jr.
(74) *Attorney, Agent, or Firm* — Nicholas Pfeifer; Ronald E. Smith; Smith & Hopen, P.A.

(57) ABSTRACT

A hide-on washer module includes striker assemblies mounted for vertical displacement from hydraulic cylinders. When each hydraulic piston reciprocates vertically, the striker assemblies and T-shaped tracking plates are displaced concomitantly. Roller assemblies are mounted to floor-mounted vertical columns that are interconnected to one another by stabilizer plates. A first set of roller assemblies engages a first tracking plate, a second set of roller assemblies engages a second reciprocating tracking plate, a third set of roller assemblies are mounted to the rear side of a front column, a fourth set of roller assemblies are mounted to the front side of a rear column, a fifth set of roller assemblies is mounted to the rear side of a front column, and a sixth set of roller assemblies is mounted to the front side of a rear column. Each roller assembly is biased to bear against its associated tracking plate.

20 Claims, 19 Drawing Sheets

(56) References Cited

U.S. PATENT DOCUMENTS

| | | | |
|---|---|---|---|
| 8,070,568 B1* | 12/2011 | Griffiths | A22B 5/0082 452/123 |
| 2010/0297923 A1* | 11/2010 | Brown | A22B 5/0082 452/173 |
| 2015/0264942 A1* | 9/2015 | Espy | A22B 5/0082 452/173 |

* cited by examiner

HIDE-ON WASHER WITH RECIPROCATING BRUSHES

CROSS-REFERENCE TO RELATED APPLICATIONS

This nonprovisional application is a continuation of and claims priority to provisional application No. 62/104,984, entitled "HIDE-ON WASHER WITH RECIPROCATING BRUSHES," filed Jan. 19, 2015 by the same inventor.

BACKGROUND OF THE INVENTION

1. Field of the Invention

This invention relates, generally, to devices that clean animal carcasses. More particularly, it relates to a hide-on washer with rotating brushes that reciprocate in a vertical plane so that the entire hide is washed.

2. Description of the Prior Art

The purpose of washing animal carcasses after slaughter and prior to hide removal is to reduce or remove organic matter and pathogens that are likely to be present on all carcasses, thus lessening the chances of cross-contamination from hide to raw meat. Hide-on washers are a necessity, but these washers are large machines that occupy a considerable amount of space. It includes multiple stations in longitudinal array and thus requires a substantial amount of space.

Accordingly, what is needed is an effective hide-on washer that occupies substantially less space than known washers. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for an effective hide-on washer that conserves space is now met by a new, useful, and non-obvious invention.

The inventive structure includes two hide-on washer modules, each of which includes three striker assemblies mounted for displacement in a vertical plane by hydraulic cylinders. The washer modules are placed in transversely spaced apart relation to one another so that a carcass can be transported between them and brushed and washed thoroughly. The transportation means is an overhead system from which the carcass hangs.

When the plunger/piston of each hydraulic cylinder reciprocates up and down, the only parts displaced concomitantly with such motion are the three striker assemblies of each washer module and four vertically disposed tracking plates that are T-shaped in plan view. The axles about which the strikers are mounted and the T-shaped tracking plates are connected to the hydraulic cylinders by a frame so that the reciprocating motion of the hydraulic cylinders causes a simultaneous and corresponding reciprocation of the four tracking plates and the three sets of rotatably mounted strikers and their axles. Plural sets of roller assemblies engage the tracking plates as the tracking plates reciprocate in a vertical plane. The roller assemblies are mounted to stationary floor-mounted vertical columns and said stationary vertical columns, six in number, are interconnected to one another by stabilizer plates.

More particularly, a first set of roller assemblies is mounted to a first stationary floor-mounted vertical column and the rollers thereof engage a web of a first reciprocating tracking plate that is positioned outboard of said first vertical column.

A second set of roller assemblies is mounted to a second stationary floor-mounted vertical column that is longitudinally spaced apart from the first vertical column and the rollers of said second set engage a web of a second tracking plate that is positioned outboard of said second vertical column.

A third set of roller assemblies is mounted to the rear side of a third vertical column that is positioned outboard of the first vertical column, and the rollers of said third set engage a front side of a web of a third tracking plate that is positioned outboard of said first vertical column.

A fourth set of roller assemblies is mounted to the front side of a fourth vertical column that is positioned in transversely spaced relation to the third vertical column, and the rollers of said fourth set engage a rear side of said web of said third tracking plate so that said third tracking plate is sandwiched between the third and fourth sets of roller assemblies.

A fifth set of roller assemblies is mounted to the front side of a fifth vertical column that is positioned in longitudinally spaced relation to the third vertical column, and the rollers of said fifth set engage a rear side of a web of a fourth tracking plate.

A sixth set of roller assemblies is mounted to the front side of a sixth vertical column that is positioned in longitudinally spaced relation to the fourth vertical column and in transversely spaced relation to the fifth vertical column, and the rollers of said sixth set engage a rear side of said web of said fourth tracking plate so that said web is sandwiched between the fifth and sixth sets of roller assemblies.

An important object of the invention is to provide a hide-on washer that thoroughly cleans and brushes a carcass.

Another important object is to provide a hide-on washer that occupies substantially less space than hide-on washers of the prior art.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Figure 7:
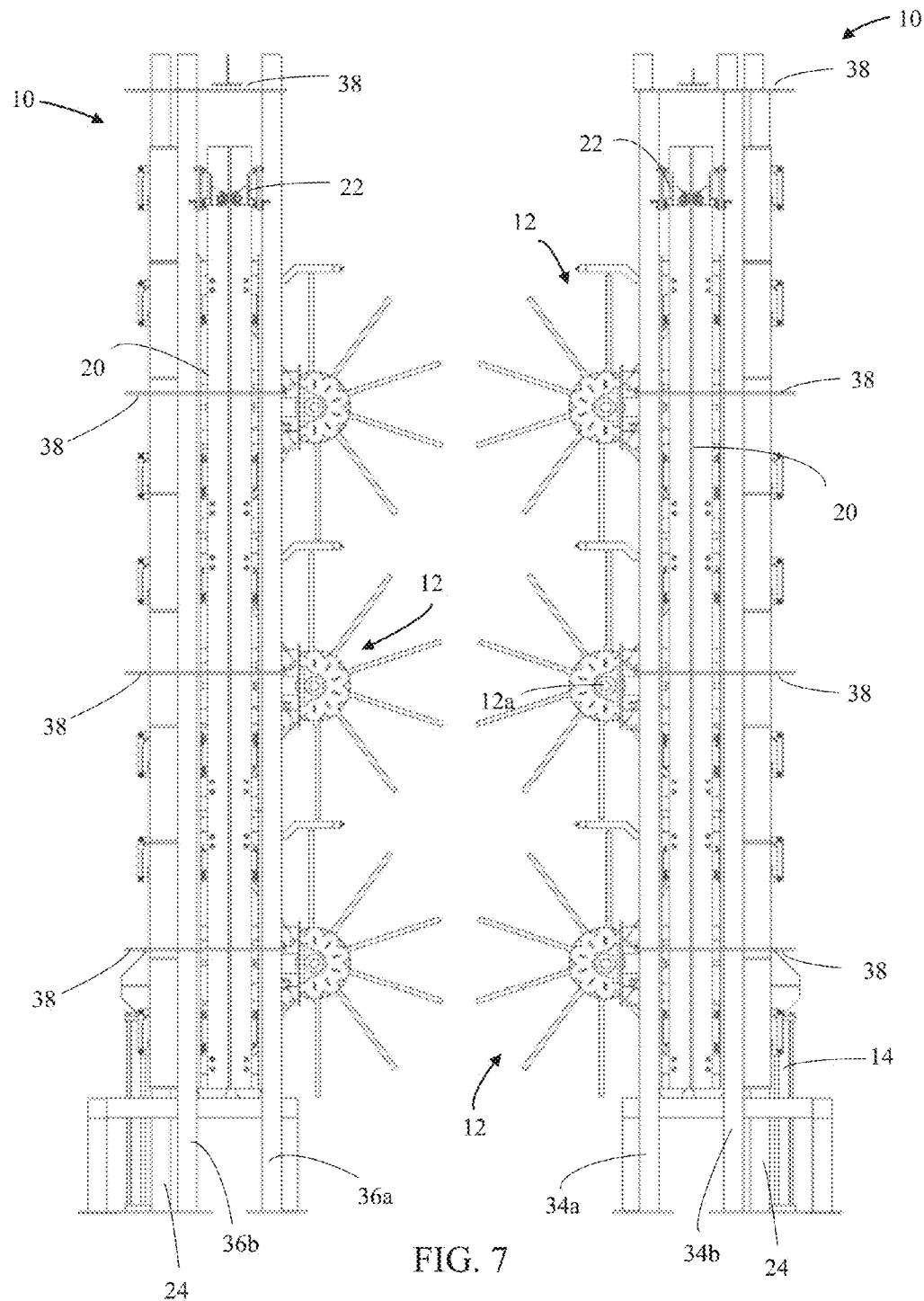
FIG. 7 is an end view of the novel structure.
Figure 8:
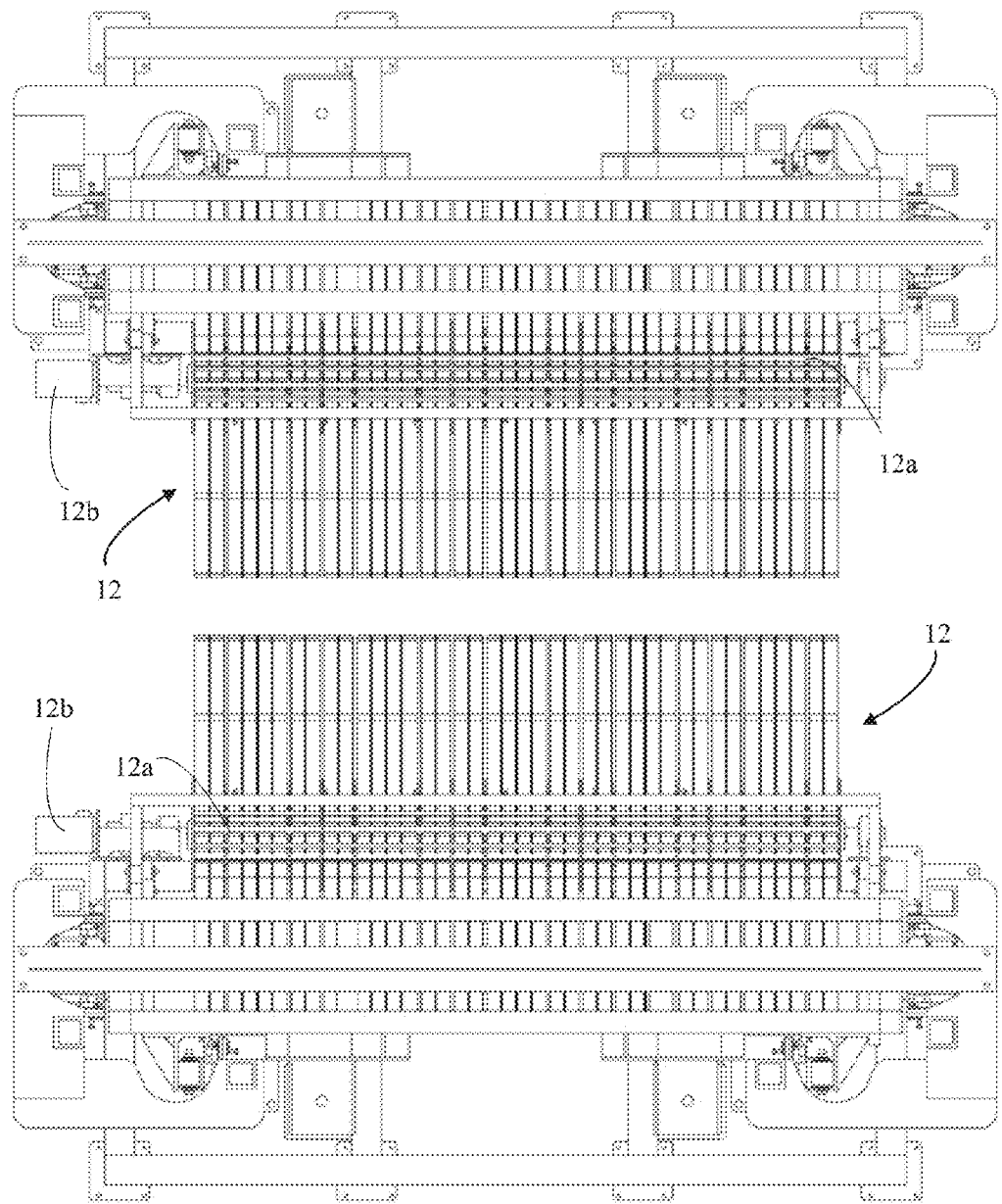
FIG. 8 is a top plan view of the novel structure.

FIGS. 1A-D depicts an illustrative embodiment of the novel structure that is denoted as a whole by the reference numeral 10. Novel structure 10 is a single washer module. A carcass passes between two washer modules 10 that are transversely spaced apart from one another relative to a longitudinal path of travel of the carcass as shown in FIGS. 7-8. The means for carrying the carcass between the confronting carcasses is disclosed in U.S. Pat. No. 8,070,568, which patent is incorporated into this disclosure by reference.

In the illustrative embodiment, each module 10 includes three striker assemblies, each denoted by reference numeral 12 as best shown in FIG. 7. Striker assemblies 12 are mounted to module 10 for reciprocating displacement in a vertical plane. Each striker assembly 12 rotates about longitudinally extending horizontal axis of rotation 12a as it reciprocates up and down. The rotation is motor-driven and the reciprocation is driven by two longitudinally spaced apart hydraulic cylinders 14 that are synchronized with one another.

Figure 1B:
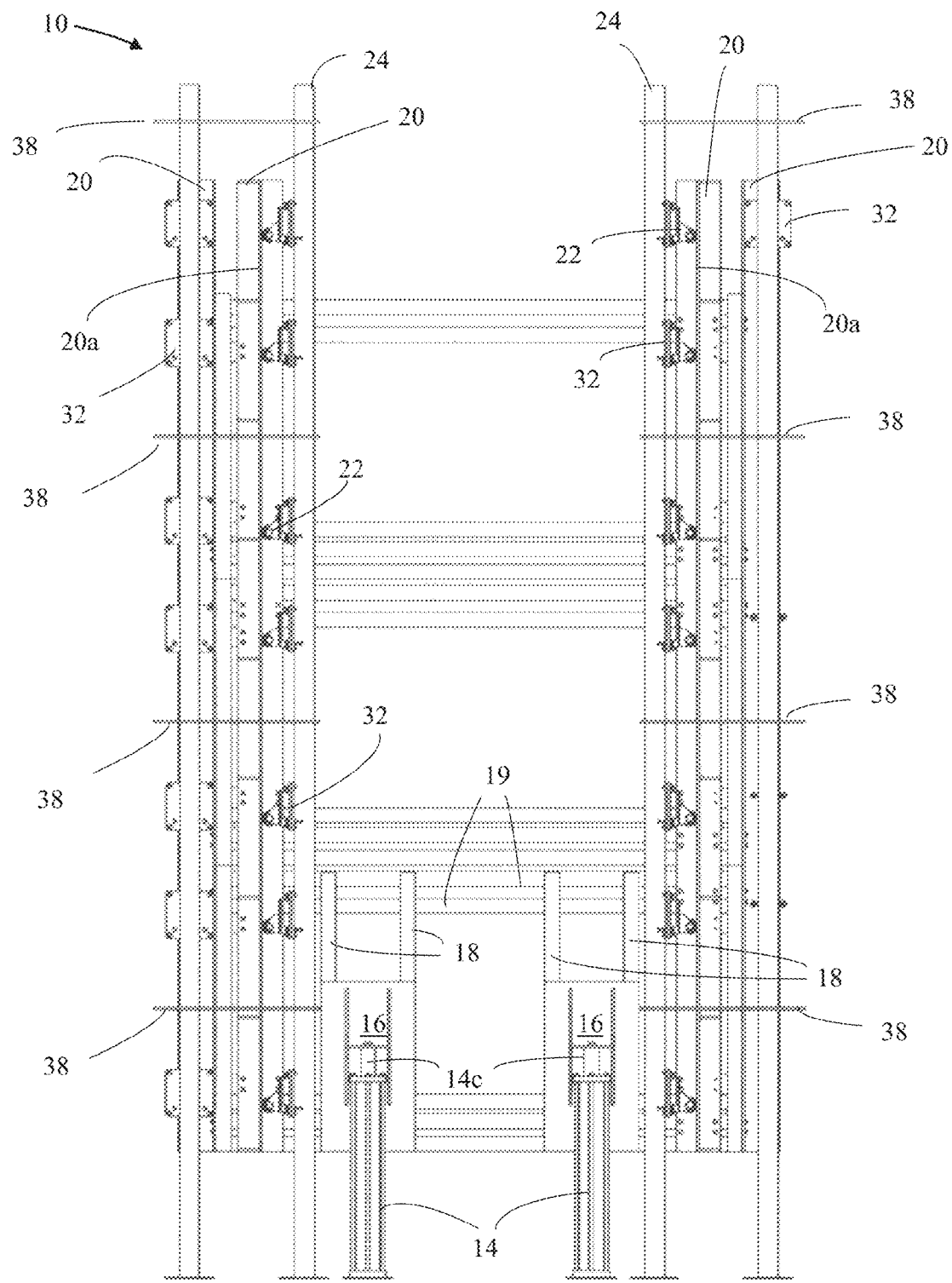
FIG. 1B is a rear elevation view of the structure depicted in FIG. 1A.
Figure 1C:
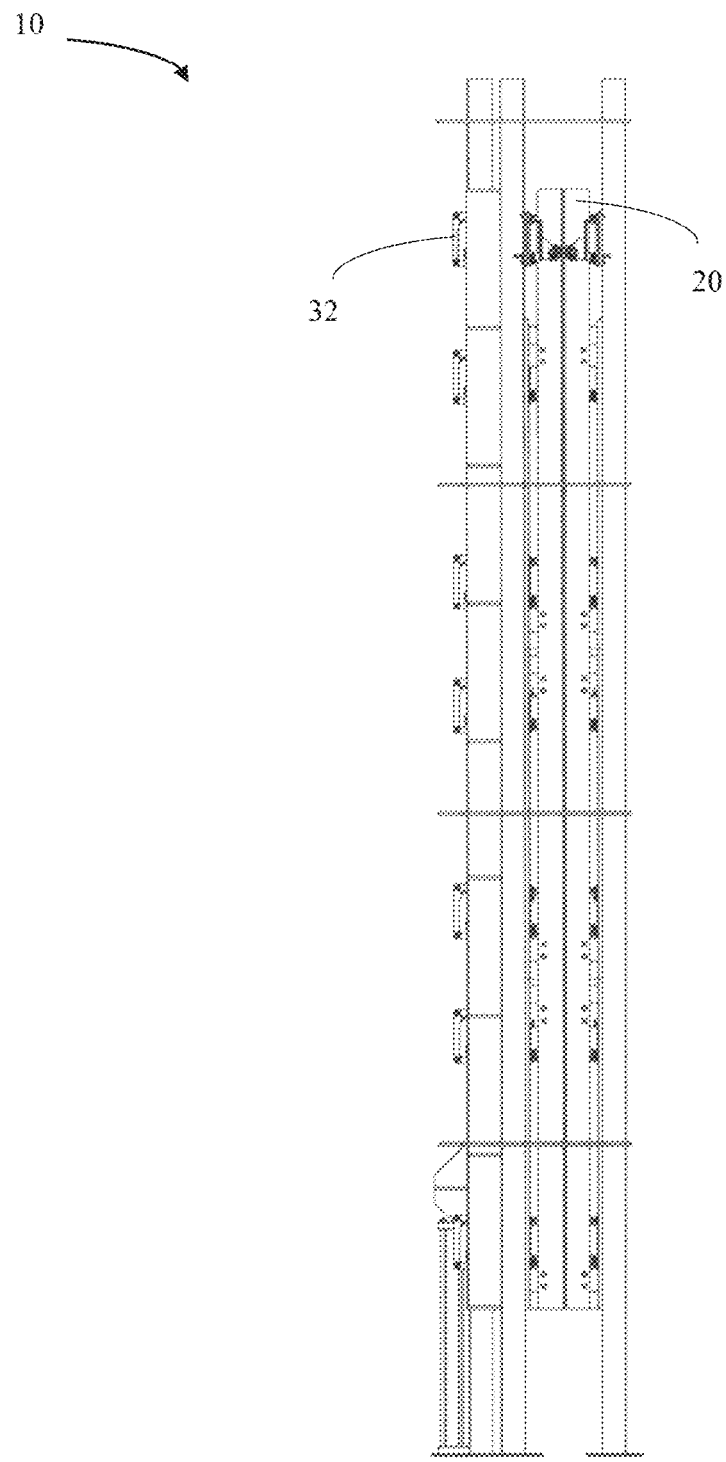
FIG. 1C is a side elevation of the structure depicted in FIG. 1A.
Figure 2:
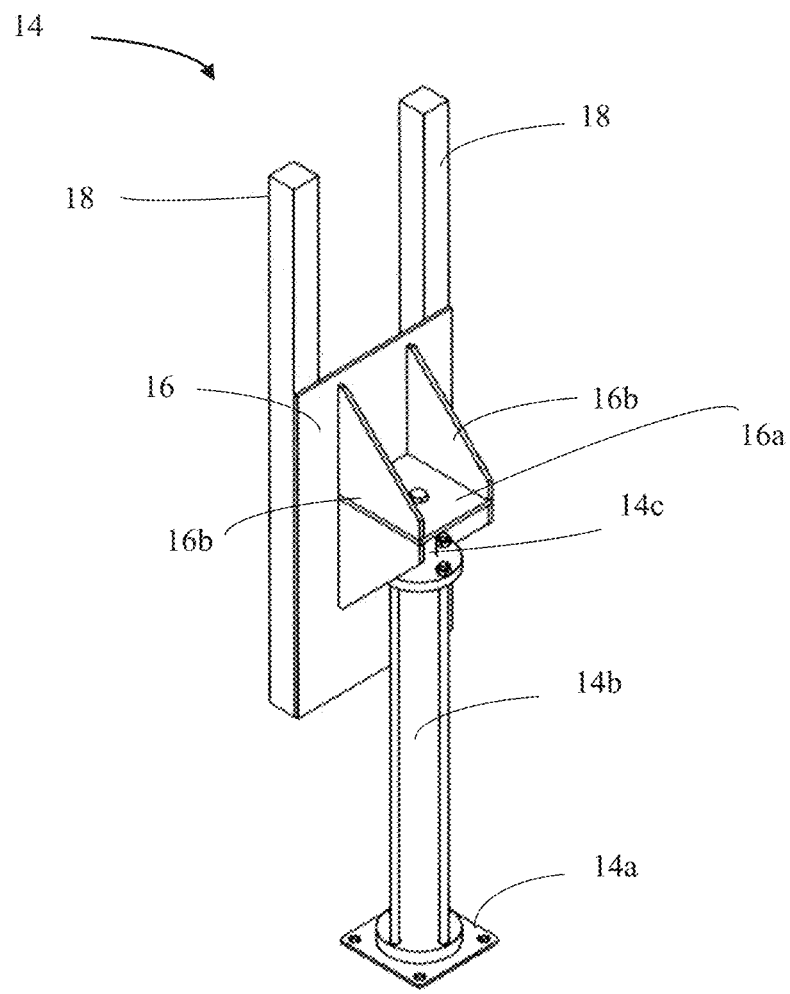
FIG. 2 is a perspective view of a hydraulic cylinder that drives the novel reciprocating up and down motion of the strikers and the T-shaped tracking plates in a vertical plane.

As best depicted in FIG. 2, each hydraulic cylinder 14 includes base 14a secured to a substantially horizontal and flat floor/support surface and housing 14b, which houses piston rod 14c. Piston rod 14c is secured to horizontal plate 16a which has transversely disposed vertical walls, collectively denoted 16b, secured to its opposite edges and each of said vertical walls 16b is secured to longitudinally disposed vertical lifting plate 16. Vertical lifting plate 16 is secured to vertically disposed lifting arms 18, which are secured to frame 19 as shown in FIG. 1b. Striker assemblies 12 are secured to frame 19, thereby enabling hydraulic cylinders 14 to drive the reciprocating displacement of striker assemblies 12.

Figure 1A:
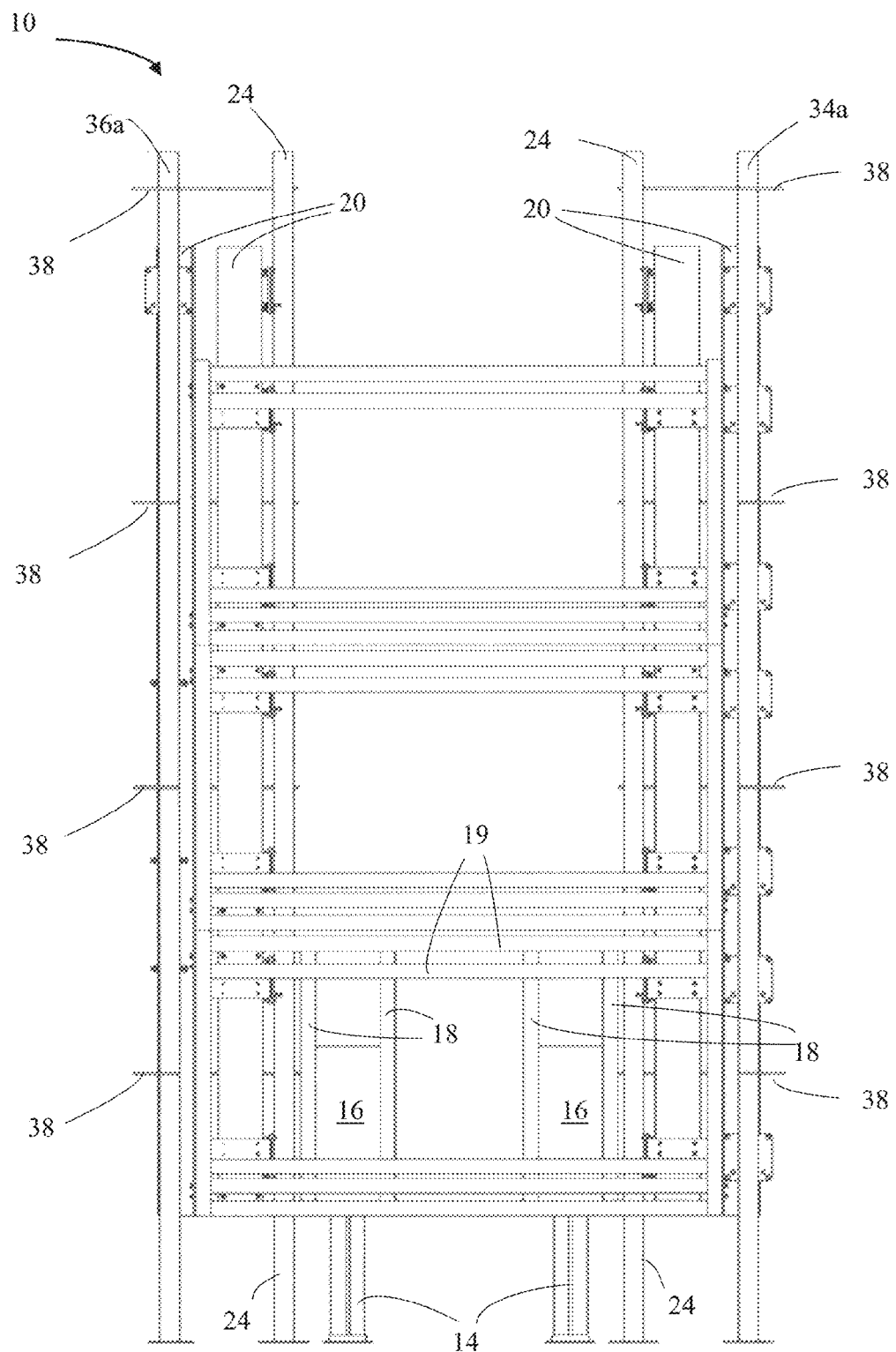
FIG. 1A is a front elevation view of an embodiment of the washer module without the striker assemblies.

The carcass travels through apparatus 10 from left to right or right to left, i.e., in the plane of the paper as FIGS. 1A-B is viewed. For that reason, vertical walls 16b are characterized as being transversely disposed because they are transversely disposed relative to said path of travel and lifting plate 16 is characterized as being longitudinally disposed.

Referring again to FIGS. 1A-D, it will now be understood that the three striker assemblies 12 are concomitantly displaced when hydraulic piston rods 14c reciprocates up and down along its vertical axis. As shown in the embodiment, four tracking plates collectively denoted 20 are also displaced concomitantly along with striker assemblies 12 when hydraulic piston rods 14c reciprocate in the vertical direction.

Figure 3A:
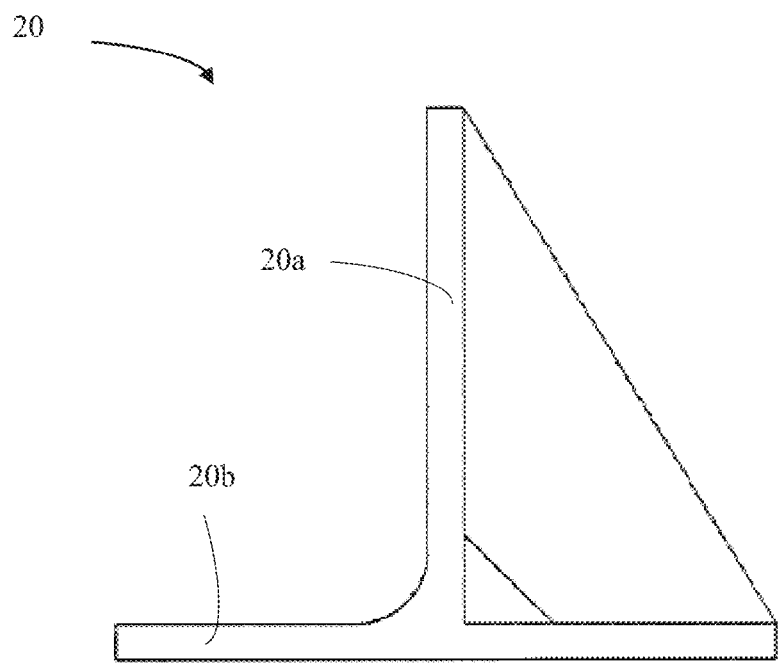
FIG. 3A is a plan view of a T-shaped tracking plate having a braced web.
Figure 3B:
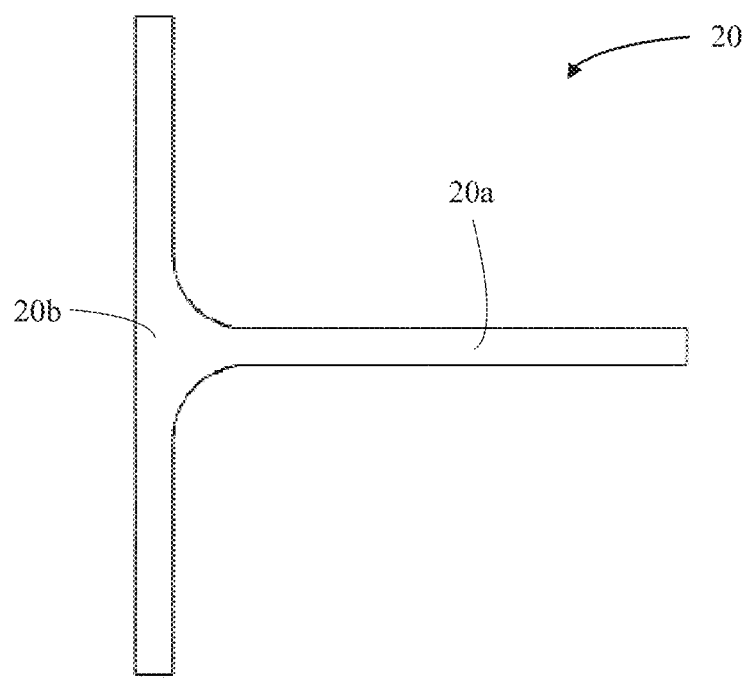
FIG. 3B is a plan view of a T-shaped tracking plate having a web that is not braced.

As perhaps best depicted in FIGS. 3A and 3B, each tracking plate 20 has a T-shaped cross-section, i.e., is T-shaped when seen in a top or bottom plan view. Tracking plates 20 are secured to frame 19 such that tracking plates 20 are displaced concomitantly with striker assemblies 12. Tracking plates 20 work in conjunction with novel roller assembles 22 to guide the striker assemblies in a predetermined vertical path of travel.

The T-shape of tracking plates 20 can be broken down into parts 20a and 20b. In a preferred commercial embodiment, parts 20a and 20b are seven inches and nine inches in length, respectively, however, the invention is not limited to those dimensions. Part 20a is a web that is engaged by the novel roller assemblies 22 as the tracking plates reciprocate up and down with striker assemblies 12. Web 20a may be braced or unbraced as depicted in FIGS. 3A and 3B, respectively.

Returning to FIG. 1B, two sets of roller assemblies, collectively denoted 22, rollingly engage flat web surfaces 20a, 20a of tracking plates 20, 20 as said tracking plates reciprocate up and down under the control of hydraulic piston rod 14c. Each roller assembly set 22 is mounted to a vertical column 24, 24 which is mounted to the floor/support surface on the outboard side of its associated hydraulic cylinder 14. Vertical columns 24, 24 are the first and second floor mounted vertical columns. These vertical columns maintain stability in the longitudinal direction of module 10 by applying an equal and directionally opposite longitudinal force onto tracking plates 20 through roller assemblies 22. Additional floor mounted vertical columns, which maintain transversal stability are discussed later in the disclosure.

Figure 4A:
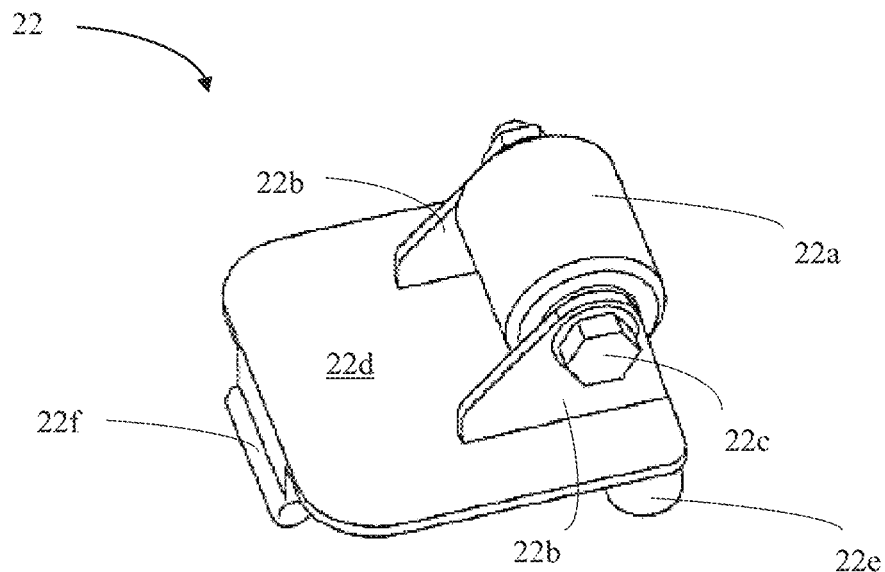
FIG. 4A is a perspective view of the novel roller assembly.

As depicted in FIG. 4A, each roller assembly 22 includes a rotatably mounted roller 22a having an axis of rotation defined by suitable axle 22c. Axle 22c in the illustrative embodiment takes the form of a bolt, which extends through apertures formed in transversely spaced apart mounting plates 22b. Each mounting plate 22b is secured to roller base plate 22d.

Figure 4B:
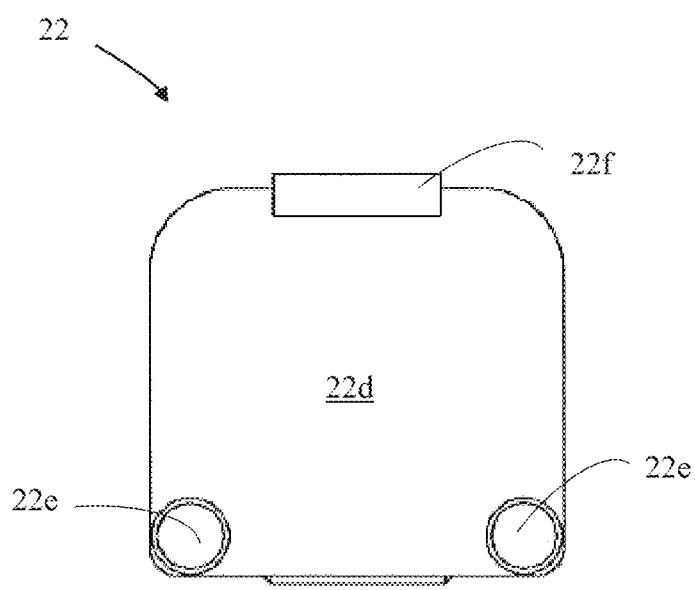
FIG. 4B is a rear elevation view of said roller assembly.
Figure 4C:
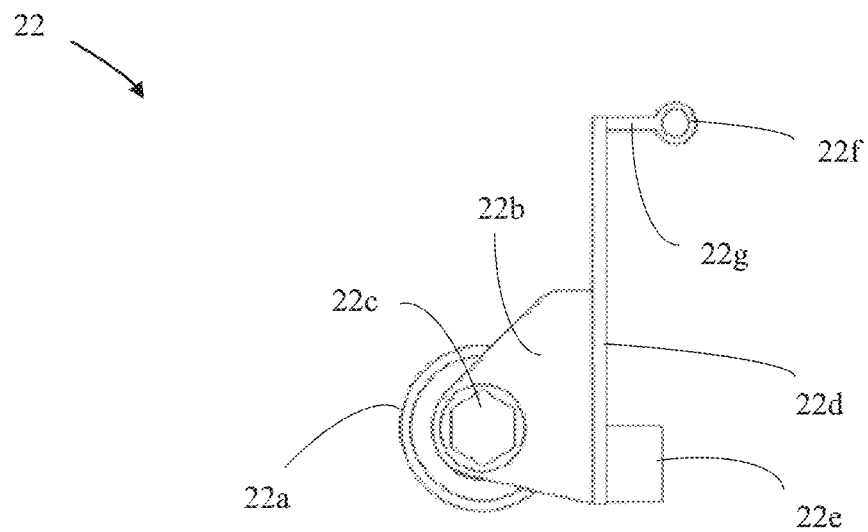
FIG. 4C is a side elevation view of said roller assembly.
Figure 4D:
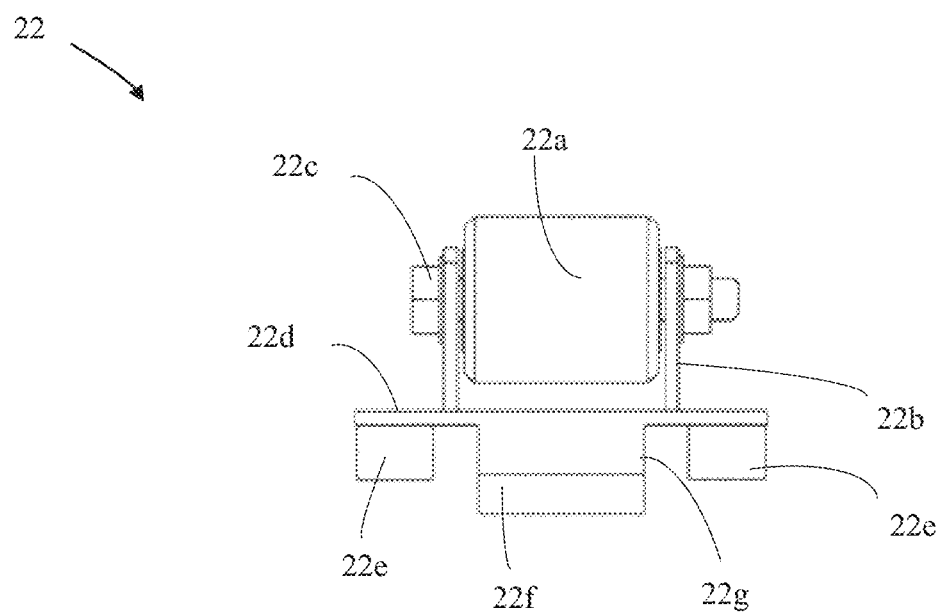
FIG. 4D is a plan view of said roller assembly.

As also depicted in FIGS. 4B, 4C and 4D, a pair of spring housings, collectively denoted 22e, is secured to a lowermost end of each roller base plate 22d. Each spring housing 22e houses a coil spring or other suitable bias means, not depicted, that urges each roller 22a against web 20a of a tracking plate 20. Pivot pin housing 22f is secured to the uppermost end of each roller base plate 22d by pivot plate 22g, which is normal to the plane of roller base plate 22d.

Figure 4E:
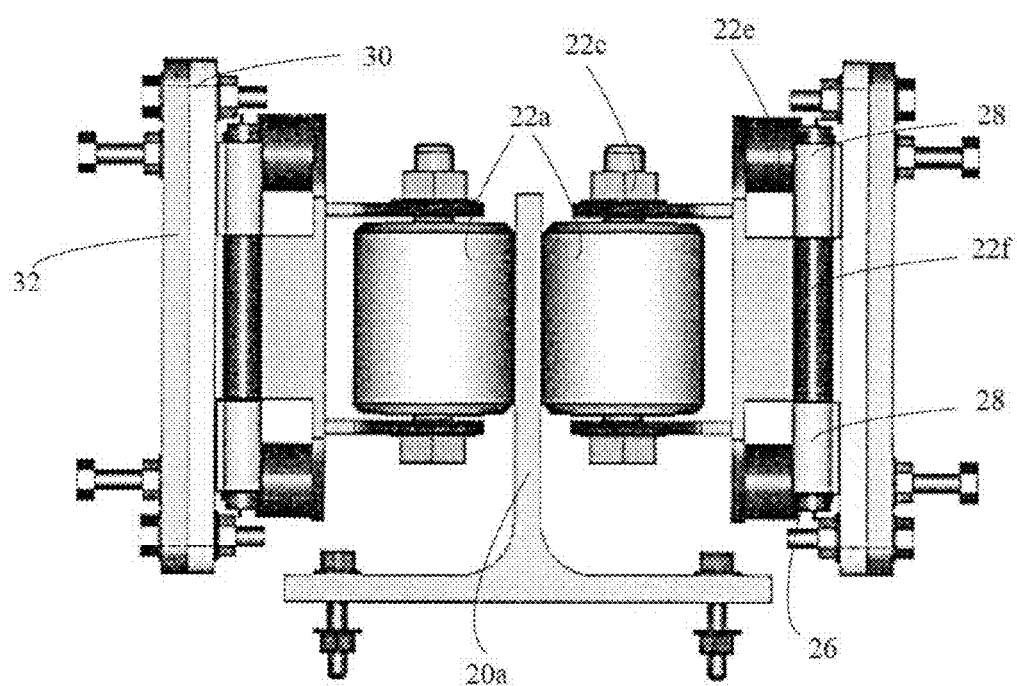
FIG. 4E is a plan view depicting opposed roller assemblies in engagement with a web of a T-shaped tracking plate.
Figure 4F:
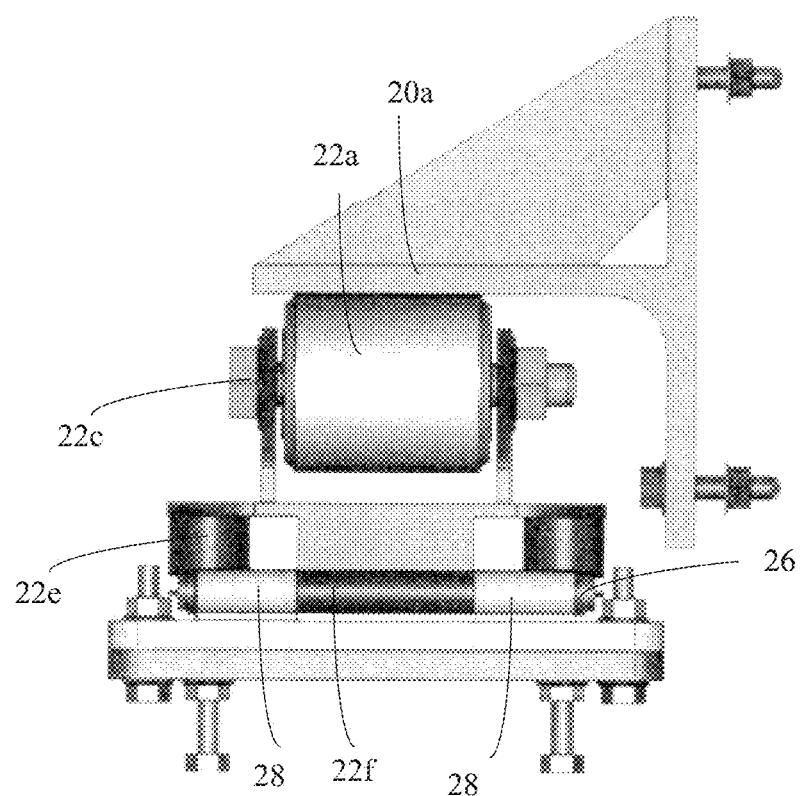
FIG. 4F is a plan view depicting a single roller assembly in engagement with a web of a T-shaped tracking plate.
Figure 5A:
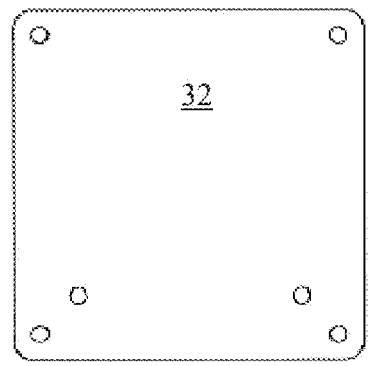
FIG. 5A is a front elevation view of a roller base plate.
Figure 5B:
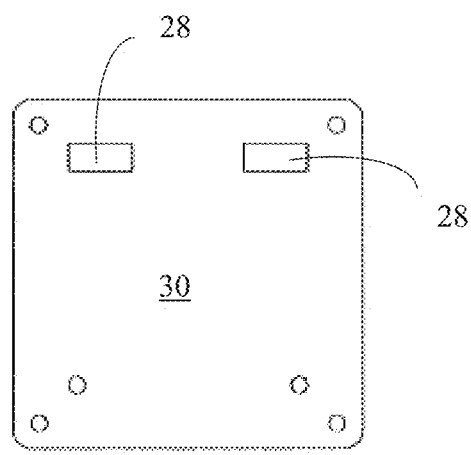
FIG. 5B is a front elevation view of a hinged roller base plate.

Referring now to FIGS. 4E and 4F in conjunction with FIGS. 5A and 5B, each roller assembly 22 is pivotally attached to flat mounting plate 30. Flat mounting plate 30 includes cylindrical pivot pin end housings 28, which align axially with pivot pin housing 22f to receive elongate pivot pin 26. Elongate pivot pin 26 has a length that exceeds the length of pivot pin housing 22f, such that pivot pin 26 is received by both pivot pin end housings 28 and pivot pin housing 22f. Flat mounting plate 30 is secured by suitable means to flat backing plate 32. In an embodiment, flat mounting plate 30 and flat backing plate 32 may be a single plate.

As depicted in FIG. 1B, each flat backing plate 32 is secured to its associated stationary vertical column 24. As mentioned above, flat backing plate 32 is secured to flat mounting plate 30, which is secured to a rolling assembly 22. Therefore, each rolling assembly is secured to vertical column 24. In addition, the springs in spring housing 22e force roller base plate 22d away from flat mounting plate 30, and in turn, towards web 20a of tracking plate 20.

As indicated in top view 1D, the two vertical columns that are collectively denoted by the reference numeral 24 are positioned behind strikers 12 from the perspective provided in FIG. 1A. There are four additional vertical columns positioned outboard of first and second vertical columns 24, 24 and said additional columns are denoted third and fourth vertical columns 34a, 34b and fifth and sixth vertical columns 36a, 36b. These vertical columns maintain stability in the transversal direction by applying an equal and directionally opposite force onto tracking plates 20 through roller assemblies 22. Thus, each module 10 of the illustrative embodiment includes six vertical columns, all floor/support surface mounted with each having roller assemblies secured thereto. The illustrative embodiment has seven roller assemblies associated with each of said vertical columns.

Figure 1D:
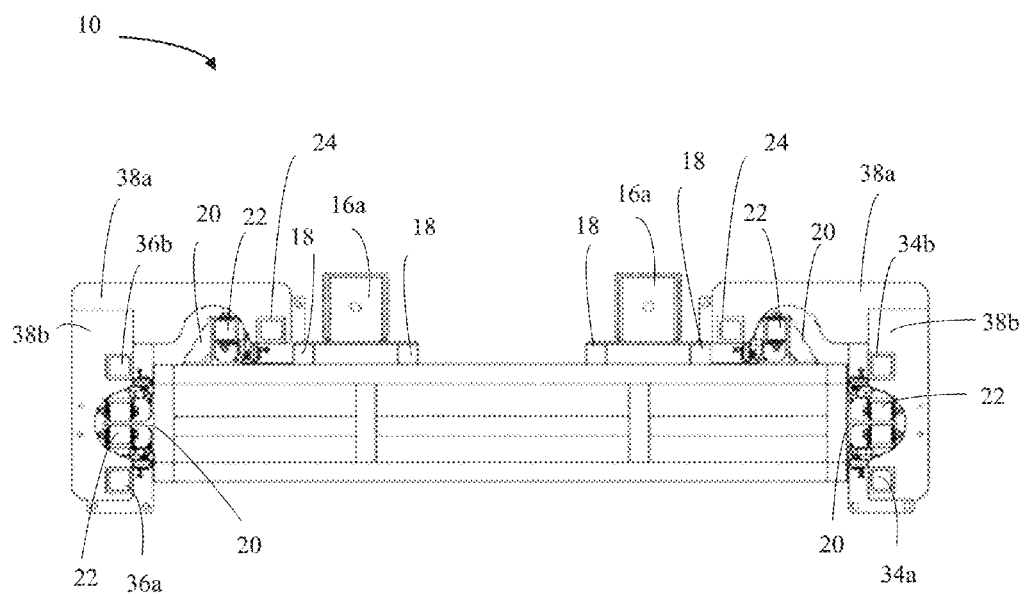
FIG. 1D is a top plan view of the structure depicted in FIG. 1A.

As depicted in FIGS. 1B and 1D, a first and second set of roller assemblies, associated with vertical columns 24, 24, engage braced webs 20a, 20a of first and second tracking plates 20, 20. A third set of roller assemblies 22 is mounted to the rear side of third column 34a and engages a front surface of unbraced web 20a of third tracking plate 20. A fourth set of roller assemblies 22 is mounted to the front side of fourth column 34b and engages a rear surface of unbraced web 20a of third tracking plate 20. A fifth set of roller assemblies 22 is mounted to the rear side of fifth column 36a and engages a front surface of unbraced web 20a of fourth tracking plate 20. Finally, a sixth set of roller assemblies 22 is mounted to the front side of sixth column 36b and engages a rear surface of unbraced web 20a of fourth tracking plate 20.

Each module 10 of the novel assembly also includes stationary stabilizer plates 38 interspaced along the vertical extent of each module 10. In a certain embodiment, each module 10 includes sixteen plates grouped into eight groups of two plates. Each group of two plates is denoted 38 in FIGS. 1A and 1B.

In the top view of FIG. 1D, the longitudinally disposed stabilizer plates that interconnect first and second vertical columns 24, 24 with fourth and sixth vertical columns 34b, 36b are collectively denoted 38a. The transversely disposed stabilizer plates that interconnect third and fifth vertical columns 34a and 36a to fourth and sixth vertical columns, 34b, 36b respectively, are denoted 38b.

Figure 6A:
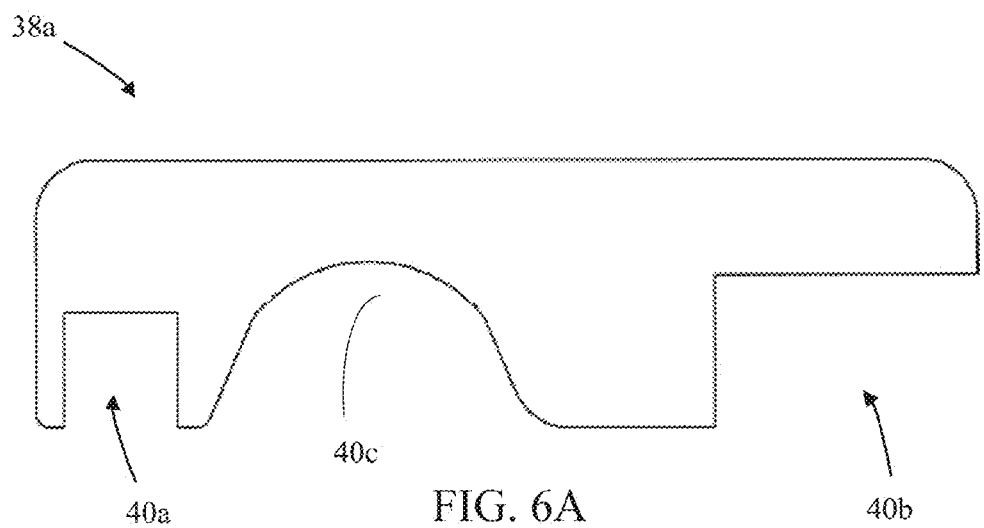
FIG. 6A is a plan view of a first stabilizer plate.
Figure 6B:
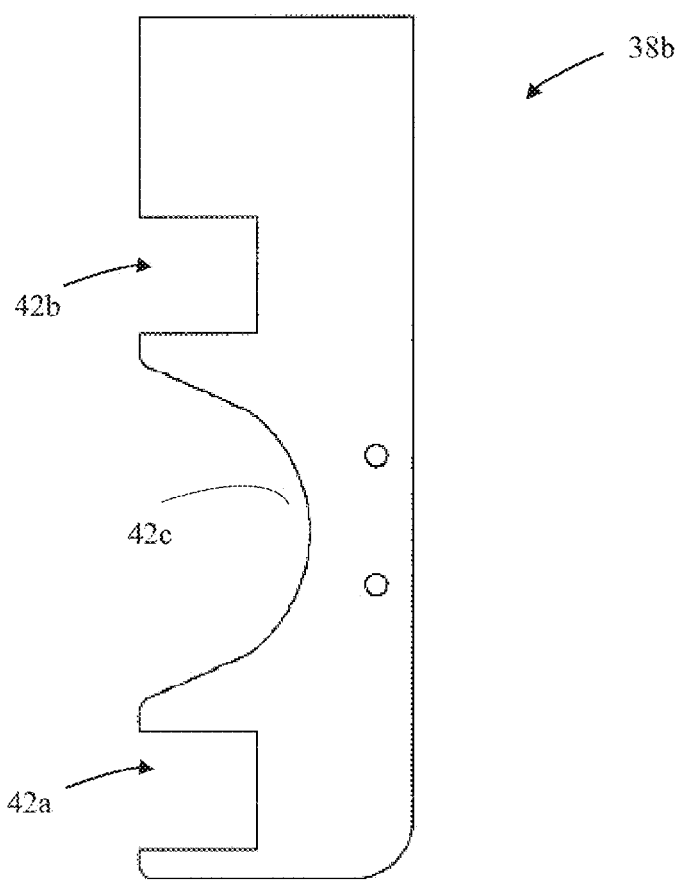
FIG. 6B is a plan view of a second stabilizer plate.

The structure of stabilizer plates 38a and 38b can be discerned from said top plan views of FIG. 1D, but such structure is shown more clearly in FIGS. 6A and 6B. In FIG. 6A, cut out area 40a receives vertical column 24 and cutout area 40b accommodates the trailing end of stabilizer plate 38b. Semicircular cutout 40c provides clearance for the web of the associated tracking plate 20. In FIG. 6B, cutout area 42a receives third vertical column 34a or fifth vertical column 36a and cutout area 42b receives fourth vertical column 34b or sixth vertical column 36b. Semicircular cutout 42c provides clearance for the web of the associated tracking plate 20.

FIG. 7 is a side view of the novel structure. This view shows how two of the above-disclosed novel modules 10 are positioned in transversely spaced apart juxtaposition to one another so that a carcass carried between them is cleaned by opposing sets of strikers 12. FIG. 7 depicts the strikers 12 in their respective lowermost positions, i.e., with hydraulic cylinders 14c fully retracted. As a carcass passes through the two modules 12, the striker assemblies rotate about horizontal axis of rotation 12a and reciprocate in the vertical direction to fully clean the carcass.

Figure 9A:
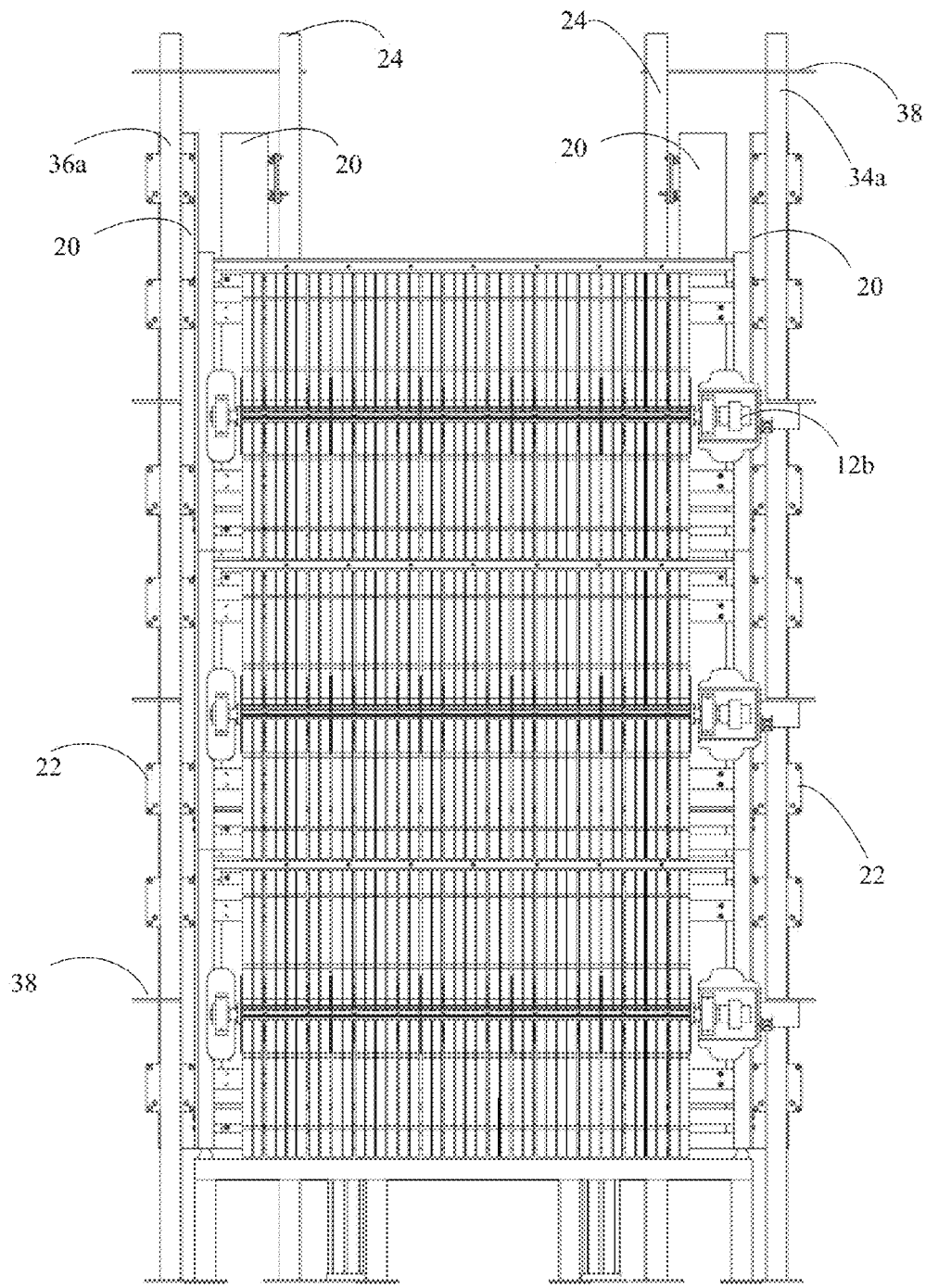
FIG. 9A is a front elevation view of the reciprocating unit with strikers mounted thereto.
Figure 9B:
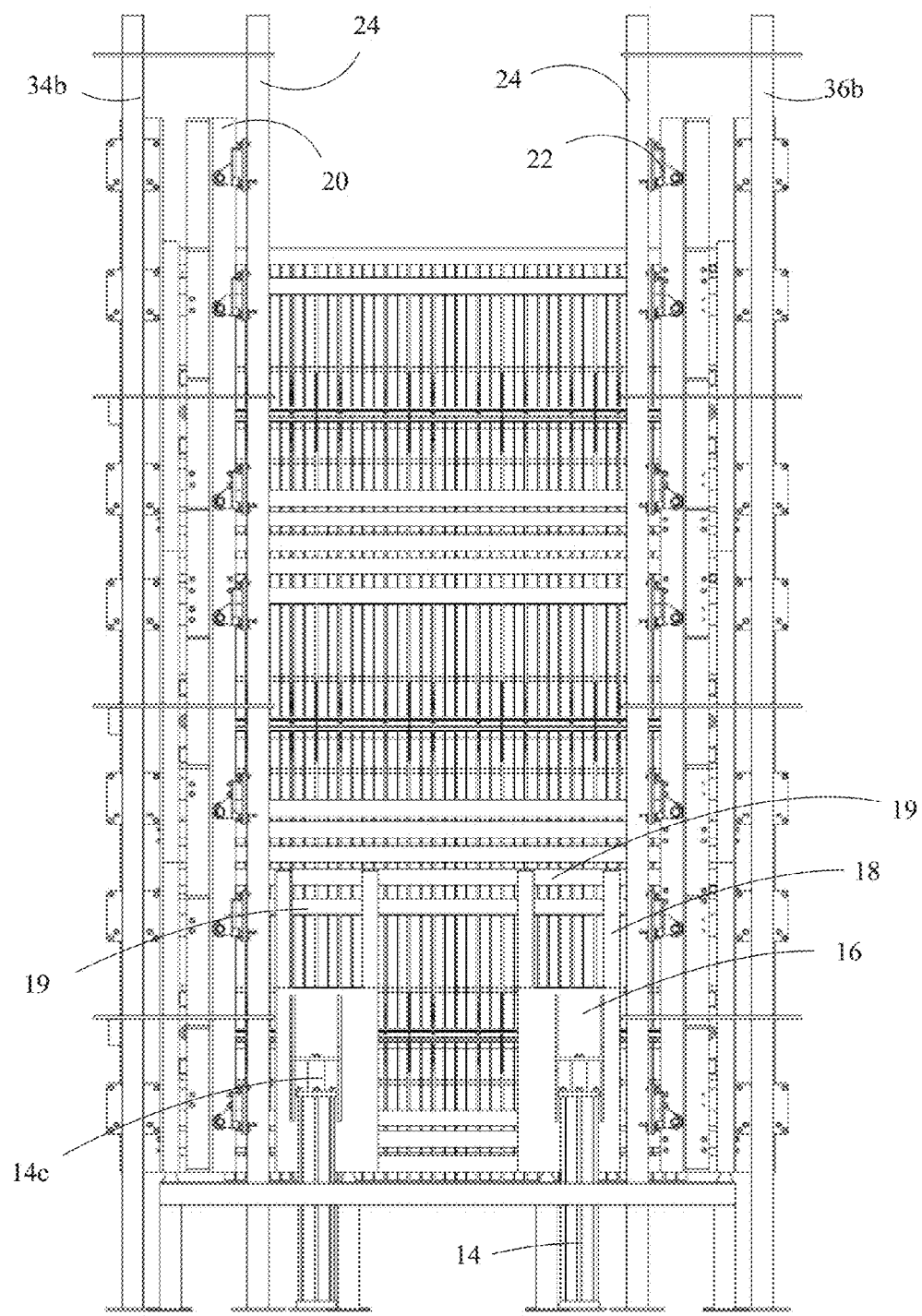
FIG. 9B is a rear elevation view of the reciprocating unit with strikers mounted thereto.
Figure 10:
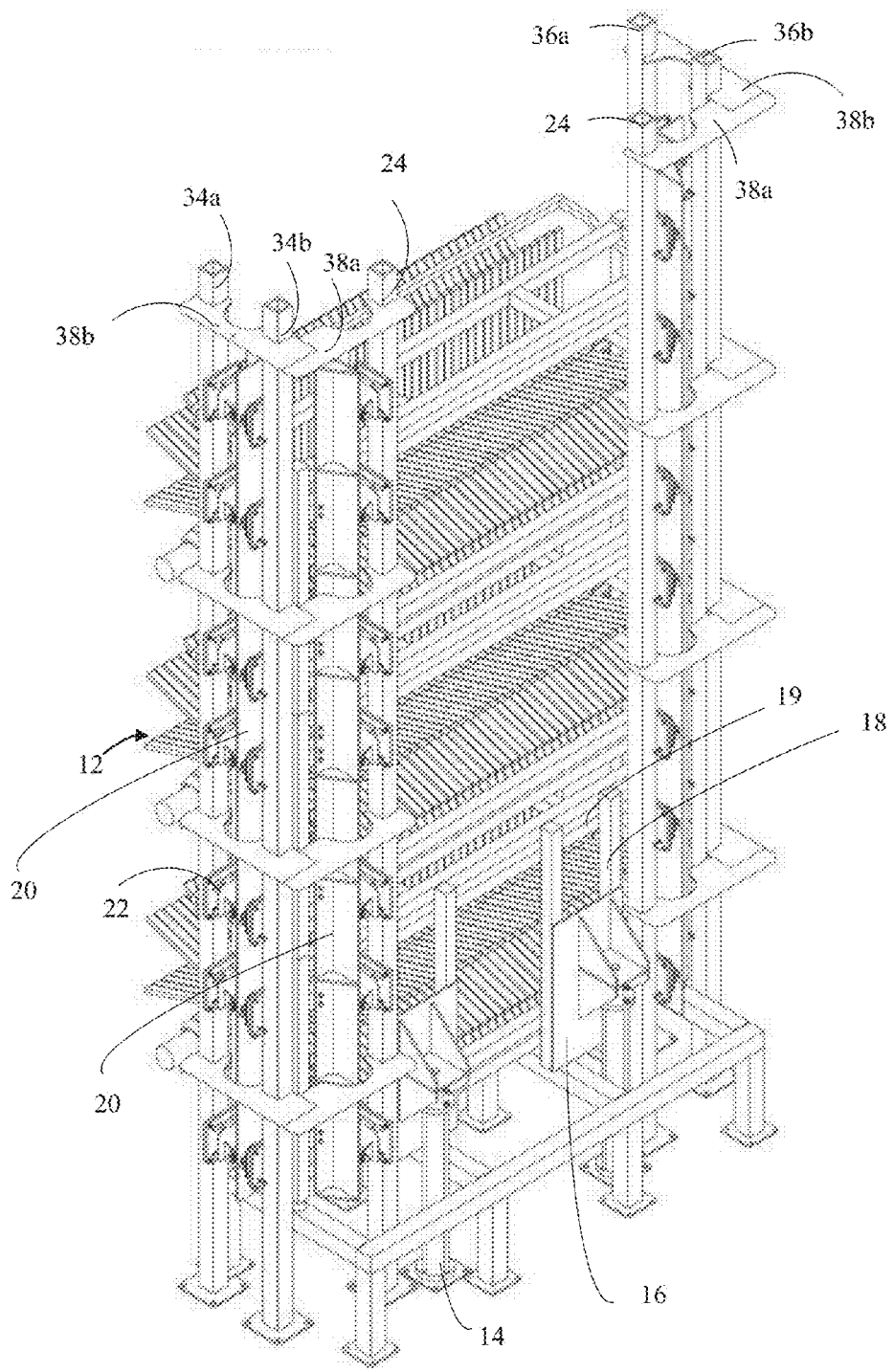
FIG. 10 is a perspective view of the reciprocating unit as depicted in FIGS. 9A and 9B.

FIGS. 8-10 provide views of the module with striker assemblies 12 mounted thereto. FIG. 8 provides a top plan view of the novel structure. FIG. 8 differs from FIG. 1D because it includes strikers 12, shaft 12a upon which the strikers are mounted, and motor 12b for rotating the strikers. FIG. 9A provides a front elevation view of the reciprocating unit with strikers 12 mounted thereto and differs from FIG. 1A because it includes the strikers, shaft 12a upon which the strikers are mounted, and motor 12b for rotating the strikers, thereby concealing many parts depicted in said FIG. 1A. FIG. 9B is a rear elevation view of the reciprocating unit with strikers 12 mounted thereto and differs from FIG. 1B because it includes the strikers, thereby concealing many parts depicted in said FIG. 1B. FIG. 10 is a perspective view of the reciprocating unit as depicted in FIGS. 9A and 9B, i.e., with the stationary top parts not depicted.

Figure 11A:
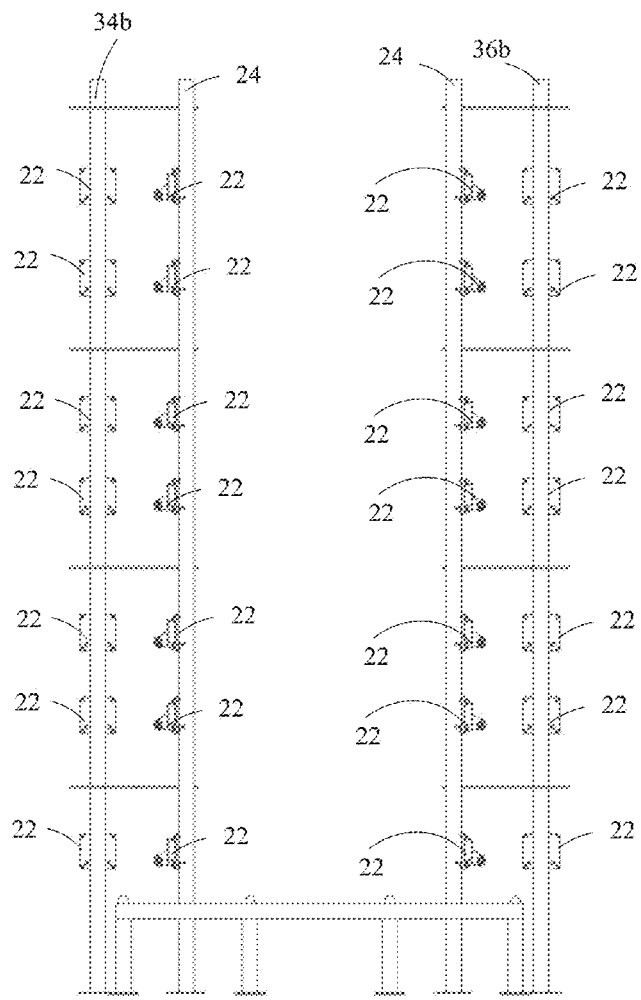
FIG. 11A is a front elevation view of the fixed structure of the novel reciprocating unit.
Figure 11B:
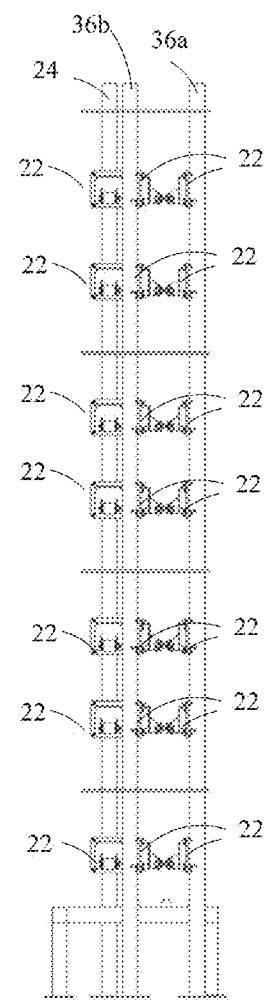
FIG. 11B is an end elevation view of the fixed structure depicted in FIG. 11A.
Figure 11C:
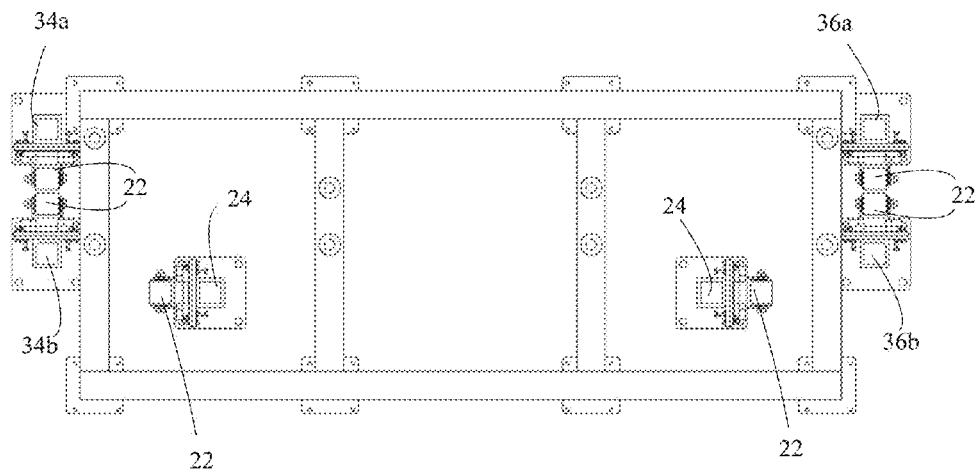
FIG. 11C is a top plan view of the fixed structure of the novel reciprocating unit depicted in FIGS. 11A and 11B.
Figure 11D:
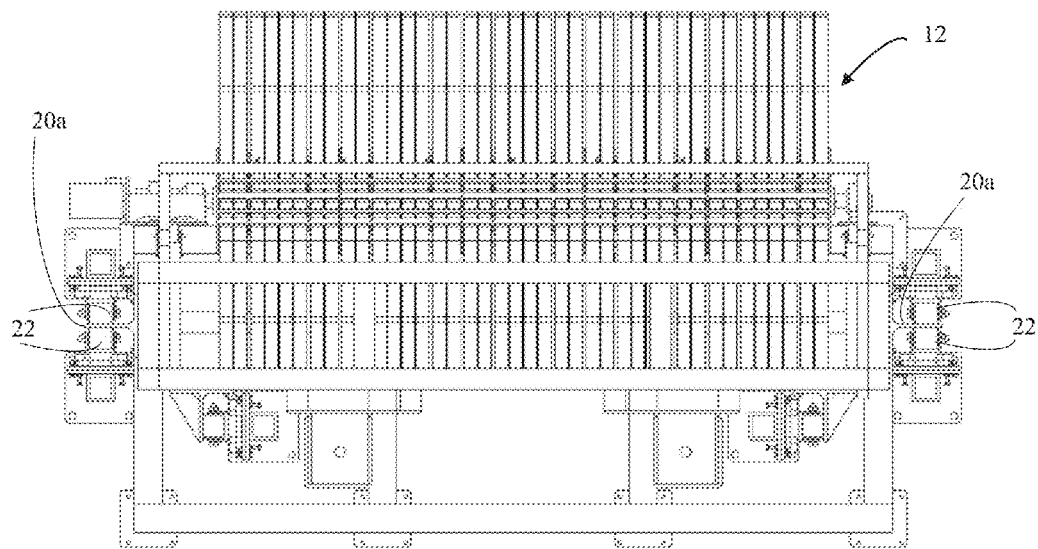
FIG. 11D is a top plan view of the novel reciprocating unit with strikers.

FIGS. 11A-11C provide several views of the stationary structure of an embodiment of module 10. In the illustrated embodiment, the roller assemblies 22 are fixed to the vertical columns 24, 34, 36. As shown in FIG. 11D, rollers 22 provide a guide for tracking plates 20 as hydraulic cylinders 14 displace striker assemblies 12 in the vertical direction. In an embodiment, tracking plates 20 may be fixed to the stationary while rollers 22 are fixed to the striker assembly 12 such that rollers 22 translate with striker assemblies 12 while tracking plates 20 remain stationary.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An apparatus for cleaning a carcass, comprising:
   an overhead conveyance system for transporting a carcass in a horizontal path of travel that extends along a longitudinal extent of a main frame, the carcass being suspended from the overhead conveyance system so that the carcass lies in a substantially vertical plane under the influence of gravity as it is transported along the longitudinal extent of the main frame;
   a striker assembly having a plurality of striking members extending radially from an axis of rotation and a motor to mechanically rotate the striking members about the axis of rotation;
   a striker assembly lifting mechanism in communication with the striker assembly, wherein the striker assembly lifting mechanism is oriented to displace the striker assembly in a vertical plane substantially parallel to the vertical plane of the carcass;
   a longitudinally stabilizing vertical column having a plurality of roller assemblies fixed thereto, wherein each roller assembly includes a roller in communication with a first vertical tracking plate, the longitudinally stabilizing vertical column is secured in a fixed position while the first vertical tracking plate is fixed with respect to the striker assembly and displaced concomitantly with the striker assembly;
   the roller assemblies fixed to the longitudinally stabilizing vertical column produce a stabilizing force on the first vertical tracking plate in a longitudinal direction while also enabling the first vertical tracking plate to roll along the roller in each roller assembly fixed to the longitudinally stabilizing vertical column when the first vertical tracking plate is displaced in the vertical direction;
   a transversely stabilizing vertical column having a plurality of roller assemblies fixed thereto, wherein each roller assembly includes a roller in communication with a second vertical tracking plate, the transversely stabilizing vertical column is secured in a fixed position while the second vertical tracking plate is fixed with respect to the striker assembly and displaced concomitantly with the striker assembly; and
   the roller assemblies fixed to the transversely stabilizing vertical column produce a stabilizing force on the second vertical tracking plate in a transversal direction while also enabling the second vertical tracking plate to roll along the roller in each roller assembly fixed to the transversely stabilizing vertical column when the second vertical tracking plate is displaced in the vertical direction.

2. The apparatus of claim 1, further comprising a pair of longitudinally stabilizing vertical columns in longitudinally spaced relation from each other with each and a pair of first vertical tracking plates, wherein each longitudinally stabilizing vertical column includes a plurality of roller assemblies applying a force to one of the pair of first vertical tracking plates.

3. The apparatus of claim 1, further comprising a first pair of transversely stabilizing vertical columns in transversely spaced relation from each other and a pair of second vertical tracking plates, wherein each transversely stabilizing vertical column includes a plurality of roller assemblies applying a force to one of the pair of second vertical tracking plates.

4. The apparatus of claim 3, further comprising a second pair of transversely stabilizing vertical columns in transversely spaced relation from each other and in longitudinally spaced relation to the first pair of transversely stabilizing vertical columns, wherein each transversely stabilizing vertical column in the second pair of transversely stabilizing vertical columns includes a plurality of roller assemblies applying a force to another one of the pair of second vertical tracking plates.

5. The apparatus of claim 1, wherein each roller assembly in the plurality of roller assemblies fixed to the transversely stabilizing vertical column further includes:
   an axle on which the roller rotates, wherein the axle is secured between two transversely spaced apart mounting plates, wherein each mounting plate is secured to a roller base plate; and
   a spring housing, secured to a lowermost end of the roller base plate, housing a spring that urges the roller away from the transversely stabilizing vertical column and towards the second vertical tracking plate.

6. The apparatus of claim 1, wherein the striker assembly lifting mechanism includes a pair of hydraulic cylinders, wherein each hydraulic cylinder includes a base, a piston housing, and a piston rod.

7. The apparatus of claim 6, further comprising:
   the piston rod secured to a horizontal plate which has transversely disposed vertical walls secured to its opposite edges and each of the vertical walls is secured to longitudinally disposed vertical lifting plate; and
   the vertical lifting plate secured to a vertically disposed lifting arm that is secured to a frame, wherein the frame is secured to the striker assemblies thereby enabling the hydraulic cylinders to displace the striker assemblies in the vertical plane.

8. The apparatus of claim 1, wherein the first and second vertical tracking plates have a T-shaped cross-section.

9. The apparatus of claim 1, wherein the longitudinally stabilizing vertical column, the transversely stabilizing vertical column, and the striker assembly lifting mechanism are secured to a stable platform.

10. The apparatus of claim 1, wherein the longitudinally stabilizing vertical column and the transversely stabilizing vertical column are interconnected through a stabilizer plate.

11. The apparatus of claim 1, further comprising three striker assemblies that are each interconnected such that the three striker assemblies are concurrently displaced in the vertical plane.

12. An apparatus for cleaning a carcass, comprising:
   an overhead conveyance system for transporting a carcass in a horizontal path of travel that extends along a longitudinal extent of a main frame, the carcass being suspended from the overhead conveyance system so that the carcass lies in a substantially vertical plane under the influence of gravity as it is transported along the longitudinal extent of the main frame;

a striker assembly having a plurality of striking members extending radially from an axis of rotation and a motor to mechanically rotate the striking members about the axis of rotation;

a striker assembly lifting mechanism in communication with the striker assembly, wherein the striker assembly lifting mechanism is oriented to displace the striker assembly in a vertical plane substantially parallel to the vertical plane of the carcass;

a longitudinally stabilizing vertical column having a plurality of roller assemblies fixed thereto, wherein each roller assembly includes a roller in communication with a first vertical tracking plate, the first vertical tracking plate is secured in a fixed position while the longitudinally stabilizing vertical column is fixed with respect to the striker assembly and displaced concomitantly with the striker assembly;

the roller assemblies fixed to the longitudinally stabilizing vertical column produce a stabilizing force on the first vertical tracking plate in a longitudinal direction while also enabling the roller on the longitudinally stabilizing vertical column to roll along the first vertical tracking plate as the longitudinally stabilizing vertical column is displaced in the vertical direction;

a transversely stabilizing vertical column having a plurality of roller assemblies fixed thereto, wherein each roller assembly includes a roller in communication with a second vertical tracking plate, the second vertical tracking plate is secured in a fixed position while the transversely stabilizing vertical column is fixed with respect to the striker assembly and displaced concomitantly with the striker assembly; and the roller assemblies fixed to the transversely stabilizing vertical column produce a stabilizing force on the second vertical tracking plate in a transversal direction while also enabling the roller on the transversely stabilizing vertical column to roll along the second vertical tracking plate when the transversely stabilizing vertical column is displaced in the vertical direction.

13. The apparatus of claim 12, further comprising a pair of longitudinally stabilizing vertical columns in longitudinally spaced relation from each other with each and a pair of first vertical tracking plates, wherein each longitudinally stabilizing vertical column includes a plurality of roller assemblies applying a force to one of the pair of first vertical tracking plates.

14. The apparatus of claim 12, further comprising a first pair of transversely stabilizing vertical columns in transversely spaced relation from each other and a pair of second vertical tracking plates, wherein each transversely stabilizing vertical column includes a plurality of roller assemblies applying a force to one of the pair of second vertical tracking plates.

15. The apparatus of claim 14, further comprising a second pair of transversely stabilizing vertical columns in transversely spaced relation from each other and in longitudinally spaced relation to the first pair of transversely stabilizing vertical columns, wherein each transversely stabilizing vertical column in the second pair of transversely stabilizing vertical columns includes a plurality of roller assemblies applying a force to another one of the pair of second vertical tracking plates.

16. The apparatus of claim 12, wherein the roller assemblies fixed to the longitudinally stabilizing vertical column further include:

an axle on which the roller rotates, wherein the axle is secured between two transversely spaced apart mounting plates, wherein each mounting plate is secured to a roller base plate; and a spring housing, secured to a lowermost end of the roller base plate, housing a spring that urges the roller away from the longitudinally stabilizing vertical column and towards the first vertical tracking plate.

17. The apparatus of claim 12, wherein the striker assembly lifting mechanism includes a pair of hydraulic cylinders, wherein each hydraulic cylinder includes a base, a piston housing, and a piston rod.

18. The apparatus of claim 17, further comprising:

the piston rod secured to a horizontal plate which has transversely disposed vertical walls secured to its opposite edges and each of the vertical walls is secured to longitudinally disposed vertical lifting plate; and the vertical lifting plate secured to a vertically disposed lifting arm that is secured to a frame, wherein the frame is secured to the striker assemblies thereby enabling the hydraulic cylinders to displace the striker assemblies in the vertical plane.

19. The apparatus of claim 12, wherein the first and second vertical tracking plates have a T-shaped cross-section.

20. The apparatus of claim 12, further comprising three striker assemblies that are each interconnected such that the three striker assemblies are concurrently displaced in the vertical plane.

* * * * *